(12) United States Patent
Fink

(10) Patent No.: US 10,890,265 B2
(45) Date of Patent: Jan. 12, 2021

(54) CHECK VALVE

(71) Applicant: FMC Technologies, Inc., Houston, TX (US)

(72) Inventor: Daniel R. Fink, Porter, TX (US)

(73) Assignee: FMC Technologies, Inc., Houston, TX (US)

( * ) Notice: Subject to any disclaimer, the term of this patent is extended or adjusted under 35 U.S.C. 154(b) by 0 days.

(21) Appl. No.: 16/301,408

(22) PCT Filed: May 22, 2017

(86) PCT No.: PCT/US2017/033883
§ 371 (c)(1),
(2) Date: Nov. 13, 2018

(87) PCT Pub. No.: WO2017/205303
PCT Pub. Date: Nov. 30, 2017

(65) Prior Publication Data
US 2019/0293193 A1    Sep. 26, 2019

Related U.S. Application Data

(60) Provisional application No. 62/340,063, filed on May 23, 2016.

(51) Int. Cl.
*F16K 15/03* (2006.01)
*F16K 27/02* (2006.01)
(Continued)

(52) U.S. Cl.
CPC ............... *F16K 15/03* (2013.01); *F16K 1/42* (2013.01); *F16K 1/44* (2013.01); *F16K 1/46* (2013.01); *F16K 15/00* (2013.01); *F16K 27/0227* (2013.01)

(58) Field of Classification Search
CPC ... F16K 15/03; F16K 1/42; F16K 1/44; F16K 1/46; F16K 27/0227
(Continued)

(56) References Cited

U.S. PATENT DOCUMENTS 2,923,317 A    2/1960    McInerney
3,068,903 A    12/1962    Haenky et al.
(Continued)

FOREIGN PATENT DOCUMENTS

DE           503294 C      7/1930
DE        27 34 229 A1     2/1979
(Continued)

*Primary Examiner* — P. Macade Nichols
(74) *Attorney, Agent, or Firm* — Henry C. Query, Jr.

(57) ABSTRACT

A check valve includes a valve body having a flow bore which extends between the inlet and outlet ends of the body, a cavity which intersects the flow bore, and an opening which is connected to the cavity. A body cap is removably secured in the opening, and a seat cartridge is configured to fit through the opening and be slidably received in the cavity. The seat cartridge has an open first end which is aligned with the opening, a second end which is located opposite the first end, a chamber which extends between the first and second ends and defines an inner wall of the seat cartridge, a first bore which extends between the chamber and an inlet bore portion, a second bore which extends between the chamber and an outlet bore portion, and a valve seat which is formed on a portion of the inner wall that surrounds the first bore. A retainer ring is positioned in the valve body between the body cap and the first end of the seat cartridge, and a flapper is pivotally connected to the retainer ring and is pivotable through the chamber between a closed position in which the flapper is positioned against the valve seat and an open position in which the flapper is displaced from the valve seat.

40 Claims, 9 Drawing Sheets

(51) Int. Cl.
  *F16K 15/00* (2006.01)
  *F16K 1/46* (2006.01)
  *F16K 1/42* (2006.01)
  *F16K 1/44* (2006.01)

(58) Field of Classification Search
  USPC .......................................................... 137/527
  See application file for complete search history.

(56) References Cited

U.S. PATENT DOCUMENTS

| | | | |
|---|---|---|---|
| 3,172,424 | A | 3/1965 | Stillwagon |
| 4,217,929 | A | 8/1980 | Pelt |
| 4,274,436 | A | 6/1981 | Smith |
| 4,294,314 | A | 10/1981 | Miyagishima et al. |
| 4,457,376 | A | 7/1984 | Carmody et al. |
| 4,469,122 | A | 9/1984 | Meek |
| 4,825,902 | A | 5/1989 | Helms |
| 4,854,342 | A | 8/1989 | Polan |
| 5,713,389 | A | 2/1998 | Wilson, Jr. et al. |
| 2005/0139266 | A1 | 6/2005 | Partridge |
| 2010/0263744 | A1 | 10/2010 | Witkowski et al. |
| 2013/0000745 | A1* | 1/2013 | Witkowski .............. F16K 15/03 137/15.18 |

FOREIGN PATENT DOCUMENTS

| | | |
|---|---|---|
| GB | 2 056 623 A | 3/1981 |
| GB | 2 056 626 A | 3/1981 |
| WO | WO 2014/144530 A1 | 9/2014 |
| WO | WO 2017/031449 A1 | 2/2017 |

\* cited by examiner

CHECK VALVE

The present application is based upon and claims priority from U.S. Provisional Patent Application No. 62/340,063 filed on May 23, 2016.

The present disclosure relates to a check valve which comprises a flapper for controlling fluid flow through the valve. More particularly, the present disclosure relates to a check valve in which the valve seat is formed on a seat cartridge that is oriented coaxially with, and is removable through, a top opening in the valve body. The present disclosure also relates to a check valve which comprises a resilient pivot pin retainer ring, or halo, that has the features and advantages discussed below.

BACKGROUND OF THE INVENTION

Certain prior art check valves have a flapper which is configured to engage a cylindrical valve seat that is positioned across a flow bore which extends longitudinally through the valve body. A larger diameter cavity is formed in the valve body coaxially with the flow bore, and the valve seat is often mounted in the cavity through a top opening in the valve body which is sealed by a body cap. The flapper is pivotally connected via a pivot pin to a retainer ring which is also mounted in the cavity through the top opening. During normal flow conditions the flapper is maintained in a raised, open position by the fluid flow, but when pressure downstream of the valve increases, the flapper pivots to a closed position under the influence of gravity and seals against the valve seat to thereby prevent backflow through the valve.

Prior art check valves have several disadvantages. For example, the body cap often comprises a hexagonal tool profile which requires a special tool to remove. Also, the valve seat is typically press fit or screwed into the valve body during assembly of the check valve, which renders field replacement difficult. In addition, when the sealing side of the flapper is coated with a resilient material, the coating can undergo plastic deformation and consequently reduce the sealing effectiveness of the flapper when the pressure in the flow bore exceeds the compressive strength of the coating material. Furthermore, at high flow velocities the fluid being conveyed through the check valve can flow over the top of the flapper, which can lead to erosion of the pivot pin and the retainer ring. Additionally, when the fluid being conveyed through the check valve contains proppants, such as sand, the proppants can erode the pivot pin, which can prevent the flapper from operating as designed.

SUMMARY OF THE INVENTION

In accordance with the present disclosure, these and other limitations in the prior art are addressed by providing a check valve which comprises a valve body which includes an inlet end, an outlet end, a flow bore that extends between the inlet and outlet ends, a cavity which intersects the flow bore, and an opening which is connected to the cavity, the flow bore comprising an inlet bore portion which extends between the inlet end and the cavity and an outlet bore portion which extends between the outlet end and the cavity; a body cap which is removably secured in the opening; a seat cartridge which is configured to fit through the opening and be slidably received in the cavity, the seat cartridge comprising an open first end which is positioned adjacent to and aligned with the opening, a second end which is located opposite the first end, a chamber which extends between the first and second ends and defines an inner wall of the seat cartridge, a first bore which extends between the chamber and the inlet bore portion, a second bore which extends between the chamber and the outlet bore portion, and a valve seat which is formed on a portion of the inner wall that surrounds the first bore; a retainer ring which is positioned in the valve body between the body cap and the first end of the seat cartridge; and a flapper which is pivotally connected to the retainer ring, the flapper being pivotable through the chamber between a closed position in which the flapper is positioned against the valve seat and an open position in which the flapper is displaced from the valve seat.

In accordance with an aspect of the disclosure, the body cap may comprise a number of radially extending lugs which are configured to be struck by a hammer to thereby loosen or tighten the body cap within the opening.

In accordance with another aspect, the body cap may comprise an annular rim portion which engages the retainer ring to thereby secure the retainer ring in position against the first end of the seat cartridge.

In accordance with yet another aspect, the retainer ring may include circular first and second sealing ridges which seal against the body cap and the first end of the seat cartridge, respectively.

In accordance with a further aspect, the retainer ring may be made of an elastomeric material. In addition, the retainer ring may include an embedded stiffening ring.

In accordance with a another aspect, the second end of the seat cartridge may be closed to thereby define a floor of the chamber. Also, the floor may be configured as a ramp which extends from proximate a radially outer portion of the valve seat to the second bore.

In accordance with yet another aspect, the valve body may comprise a punch out hole through which the second end of the seat cartridge is accessible, whereby an object may be inserted through the punch out hole and against the second end to facilitate removal of the seat cartridge from the cavity.

In accordance with a further aspect, the flapper may comprise a sealing side which is coated with a resilient material and a rigid stop ring which extends from the sealing side and limits the extent to which the resilient coating is compressed against the valve seat when the flapper is in the closed position.

In accordance with another aspect, the flapper may comprise a hinge portion which is configured to be received in a recess in the retainer ring, wherein a pivot pin is positioned in a bore which extends through the hinge portion and two holes which extend through the retainer ring on opposite sides of the recess to thereby pivotally secure the flapper to the retainer ring.

In accordance with yet another aspect, the hinge portion may comprise two inwardly projecting rims, each of which is formed proximate a corresponding axially outer end of the bore and each of which is configured to engage the pivot pin.

In accordance with a further aspect, the retainer ring may comprise two circular lips, each of which is formed adjacent an axially inner end of a corresponding hole and each of which extends axially at least partially into a corresponding cavity which is formed in an axially outer end of the bore.

In accordance with another aspect, the hinge portion may comprise two inwardly projecting rims, each of which is formed on an axially inner end of a corresponding cavity and each of which is configured to engage the pivot pin. In addition, the rims may be formed of a resilient material. Furthermore, the flapper may be coated with a resilient material and the rims may be formed integrally with the resilient coating.

In accordance with a further aspect, the flapper may comprise a sealing side which engages the valve seat and a non-sealing side which is located opposite the sealing side, and the check valve may further comprise means for preventing fluid in the check valve from flowing over the non-sealing side when the flapper is in the open position. For example, the means for preventing the fluid from flowing over the non-sealing side may comprise a sealing flange which is formed integrally with and extends radially inwardly from an inner diameter of the retainer ring and engages the non-sealing side when the flapper is in the open position.

In accordance with another embodiment of the present disclosure, a check valve is provided which comprises a valve body which includes an inlet end, an outlet end, a flow bore that extends between the inlet and outlet ends, a cavity which intersects the flow bore, and an opening which is connected to the cavity, the flow bore comprising an inlet bore portion which extends between the inlet end and the cavity and an outlet bore portion which extends between the outlet end and the cavity; a body cap which is removably secured in the opening; a seat cartridge which is configured to be inserted through the opening and slidably received in the cavity, the seat cartridge defining a fluid pathway between the inlet bore portion and the outlet bore portion; and a flapper which is pivotable through the fluid pathway into a closed position to thereby prevent fluid from flowing from the outlet bore portion to the inlet bore portion through the seat cartridge.

In accordance with an aspect of the disclosure, the check valve may further comprise a retainer ring to which the flapper is pivotally connected, the retainer ring being positioned in the valve body between the body cap and the first end of the seat cartridge.

In accordance with another aspect, the body cap may comprise an annular rim portion which engages the retainer ring to thereby secure the retainer ring in position against the seat cartridge.

In accordance with yet another aspect, the retainer ring may include circular first and second sealing ridges which seal against the body cap and the seat cartridge, respectively.

In accordance with a further aspect, the retainer ring may be made of an elastomeric material. Moreover, the retainer ring may include an embedded stiffening ring.

In accordance with another aspect of the disclosure, the seat cartridge may comprise an open first end which is positioned adjacent to and aligned with the opening; a second end which is located opposite the first end; a chamber which extends between the first and second ends and defines an inner wall of the seat cartridge; a first bore which extends between the chamber and the inlet bore portion; a second bore which extends between the chamber and the outlet bore portion; and a valve seat which is formed on a portion of the inner wall that surrounds the first bore; wherein the fluid pathway is defined by the first and second bores and the chamber; and wherein in the closed position of the flapper, the flapper engages the valve seat.

In accordance with yet another aspect, the second end of the seat cartridge may be closed to thereby define a floor of the chamber. In addition, the floor may be configured as a ramp which extends from proximate a radially outer portion of the valve seat to the second bore.

In accordance with another aspect, the valve body may comprise a punch out hole through which the second end of the seat cartridge is accessible, whereby an object may be inserted through the punch out hole and against the second end to facilitate removal of the seat cartridge from the cavity.

In accordance with a further aspect, the flapper may comprise a sealing side which is coated with a resilient material and a rigid stop ring which extends from the sealing side and limits the extent to which the resilient coating is compressed against the seat cartridge when the flapper is in the closed position.

In accordance with another aspect, the flapper may comprise a hinge portion which is configured to be received in a recess in the retainer ring, wherein a pivot pin is positioned in a bore which extends through the hinge portion and two holes which extend through the retainer ring on opposite sides of the recess to thereby pivotally secure the flapper to the retainer ring.

In accordance with yet another aspect, the hinge portion may comprise two inwardly projecting rims, each of which is formed proximate a corresponding axially outer end of the bore and each of which is configured to engage the pivot pin.

In accordance with a further aspect, the retainer ring may comprise two circular lips, each of which is formed adjacent an axially inner end of a corresponding hole and each of which extends axially at least partially into a corresponding cavity which is formed in an axially outer end of the bore.

In accordance with another aspect, the hinge portion comprises two inwardly projecting rims, each of which is formed on an axially inner end of a corresponding cavity and each of which is configured to engage the pivot pin. In addition, the lips and the rims may be formed of a resilient material. Furthermore, the flapper may be coated with a resilient material and the rims may be formed integrally with the resilient coating.

In accordance with yet another aspect, the flapper may comprise a sealing side which engages the valve seat and a non-sealing side which is located opposite the sealing side, and the check valve may further comprise means for preventing fluid in the check valve from flowing over the non-sealing side when the flapper is in the open position. For example, the means for preventing the fluid from flowing over the non-sealing side may comprise a sealing flange which is formed integrally with and extends radially inwardly from an inner diameter of the retainer ring and engages the non-sealing side when the flapper is in the open position.

The present disclosure is also directed to a method for assembling a check valve, the check valve comprising a valve body which includes an inlet end, an outlet end, a flow bore that extends between the inlet and outlet ends, a cavity which intersects the flow bore, and an opening which is connected to the cavity, the flow bore comprising an inlet bore portion which extends between the inlet end and the cavity and an outlet bore portion which extends between the outlet end and the cavity. The method comprises providing a seat cartridge which is configured to be inserted through the opening and slidably received in the cavity, the seat cartridge defining a fluid pathway between the inlet bore portion and the outlet bore portion and comprising a valve seat surrounding a portion of the fluid pathway; and inserting the seat cartridge through the opening and into the cavity.

In accordance with an aspect of the disclosure, the method may further comprise providing a retainer ring to which a flapper is pivotally connected; and positioning the retainer ring against an end of the seat cartridge which is located adjacent the opening.

In accordance with yet another aspect, the method may further comprise securing the retainer ring and the seat cartridge in position in the valve body by removably securing a body cap in the opening, the body cap being configured to engage the retainer ring when fully secured in the opening.

Thus, it may be seen that the check valve of the present disclosure offers several advantages over prior art check valves. Rather than being press fit or screwed into the valve body during assembly of the check valve, the valve seat is formed on a seat cartridge which can be inserted into the cavity through the top opening in the valve body. As a result, field replacement of the valve seat can be easily accomplished by simply removing the old seat cartridge through the top opening and then inserting a new seat cartridge into the cavity.

Furthermore, since in some embodiments of the disclosure the floor of the seat cartridge is formed as a ramp that effectively extends from the valve seat to the bore of the seat cartridge which is contiguous with the outlet bore portion of the flow bore, fluid flow through the check valve will be less likely to cause significant erosion in the outlet bore portion.

Also, in certain embodiments of the check valve wherein the flapper includes a resilient coating on its sealing side, the flapper may be provided with a rigid stop ring which extends from the sealing side and limits the extent to which the resilient coating can be compressed against the valve seat when the flapper is in the closed position. As a result, the coating will not undergo plastic deformation when the pressure in the flow bore exceeds the compressive strength of the coating material, and the flapper will consequently continue to provide an effective seal.

These and other objects and advantages of the present disclosure will be made apparent from the following detailed description, with reference to the accompanying drawings. In the drawings, the same reference numbers may be used to denote similar components in the various embodiments.

DETAILED DESCRIPTION

Figure 1:
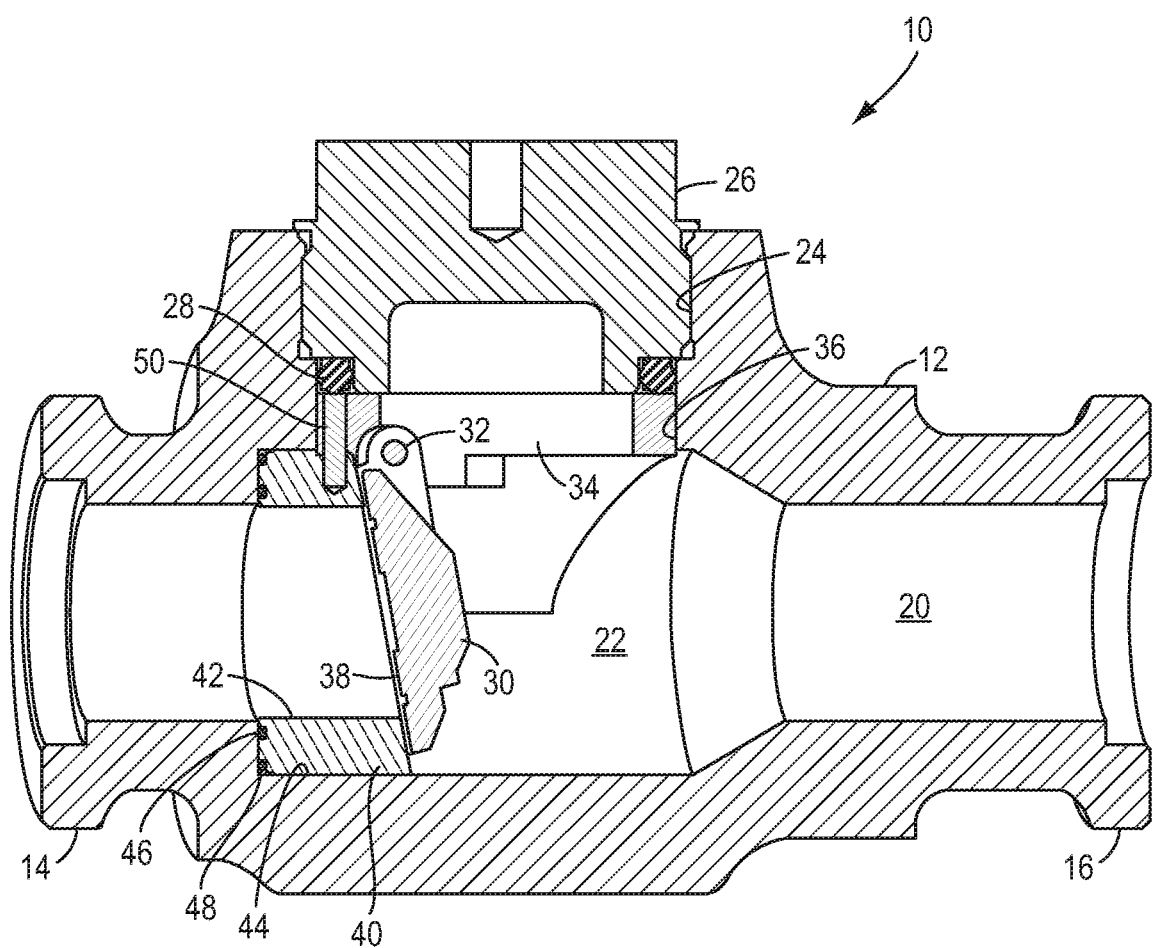
FIG. 1 is a longitudinal cross sectional view of a prior art check valve.
Figure 2:
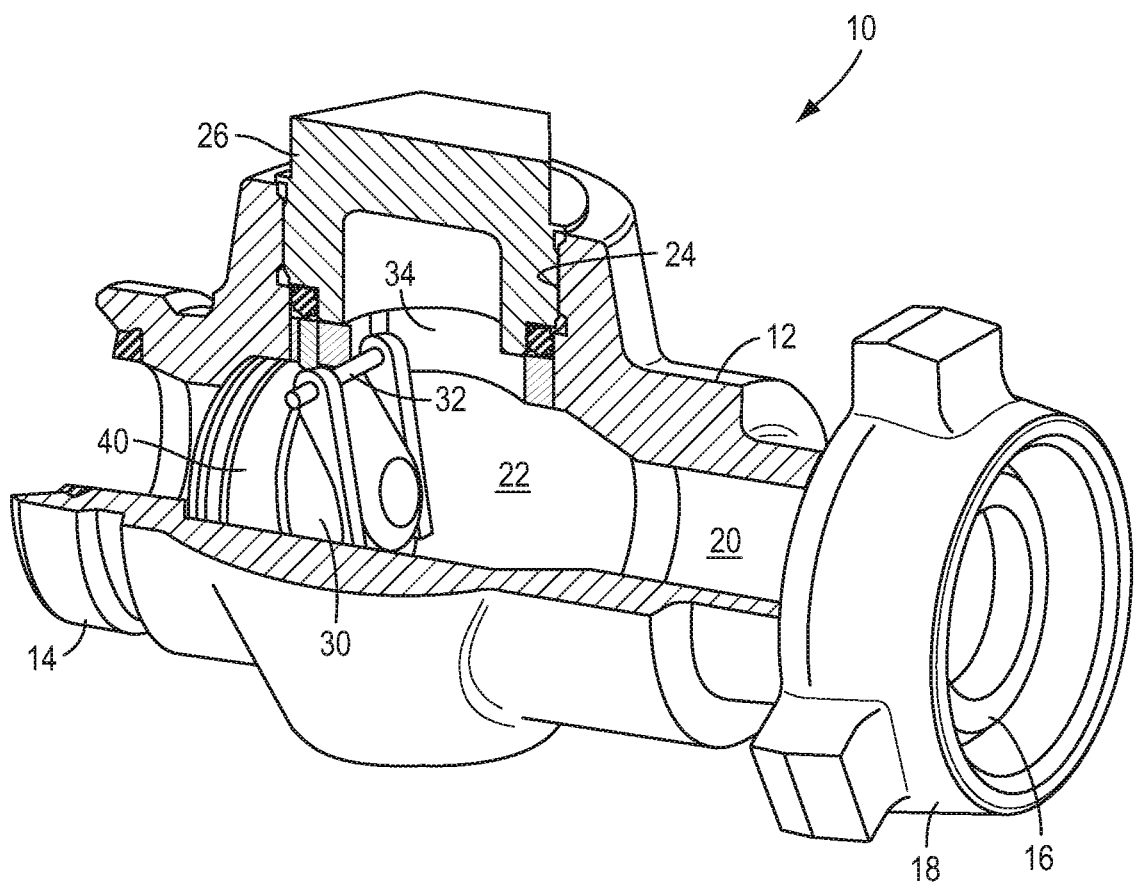
FIG. 2 is perspective view, partly in section, of the check valve shown in FIG. 1.

As context for the present disclosure, an example of a prior art check valve will first be described with reference to FIGS. 1 and 2. This prior art check valve, which is indicated generally by reference number 10, is shown to comprise a valve body 12 having first and second ends 14, 16 which are configured to be connected to flow pipes or other flow components (not shown) by suitable means, such wing unions 18 (only one of which is shown in FIG. 2) or other high pressure connections. The valve body 12 includes a flow bore 20 which extends between the first and second ends 14, 16, and a larger diameter cavity 22 which is formed coaxially within the flow bore. The cavity 22 is accessible through a top opening 24 in the valve body 12 which is closed by a removable body cap 26 that is threaded into the top opening and is sealed to the valve body by a ring seal 28.

The check valve 10 includes a flapper 30 which is pivotally connected by a pivot pin 32 to a retainer ring 34. The retainer ring 34 is received in a corresponding pocket 36 which is formed in the valve body 12 between the top opening 24 and the cavity 22 and is secured therein by the body cap 26. The flapper 30 includes a sealing side 38 which is configured to seal against a cylindrical valve seat 40. In this example, the sealing side 38 is coated with a resilient material, such as a urethane, in order to enhance the sealing capability of the flapper 30. The valve seat 40, which has a through bore 42 of approximately the same diameter as the flow bore 20, is received in a corresponding counterbore 44 in the valve body 12 and is sealed thereto by a pair of ring seals 46, 48. Both the retainer ring 34 and the valve seat 40 are maintained in their proper orientation in the cavity 22 by an alignment pin 50 which extends through a corresponding hole in the retainer ring and into a matching hole in the valve seat.

In operation of the check valve 10, fluid flows through the flow bore 20 from the first end 14 to the second end 16 and is prevented from flowing in the opposite direction by the flapper 30. When pressure or flow rate in the flow bore 20 upstream of the flapper 30 drops to a predetermined level, the flapper pivots downward into a closed position (shown in FIGS. 1 and 2) in which the sealing side 38 of the flapper seals against the valve seat 40, thereby preventing fluid from flowing through the flow bore from the second end 16 to the first end 14.

The prior art check valve 10 has several disadvantages. For example, the body cap 26 comprises a hexagonal tool profile which requires a special tool to remove. Also, the valve seat 40 is typically press fit or screwed into the valve body 12 during assembly of the check valve 10, which renders field replacement difficult. Further, due to the relatively steep transition from the larger diameter cavity 22 to the smaller diameter flow bore 20, the flow of fluid through the check valve 10 can cause significant erosion in the exit portion of the flow bore (i.e., the portion of the flow bore between the cavity and the second end 16), especially when the fluid contains proppants that are used, e.g., in hydrocarbon well fracking operations. In addition, when the sealing side 38 of the flapper 30 is coated with a resilient material, the coating can undergo plastic deformation and consequently reduce the sealing effectiveness of the flapper when the pressure in the flow bore 20 exceeds the compressive strength of the coating material. Furthermore, at high flow velocities the fluid being conveyed through the check valve 10 can flow over the top of the flapper 30, which can lead to erosion of the pivot pin 32 and the retainer ring 34. Additionally, when the fluid being conveyed through the check valve 10 contains proppants, such as sand, the proppants can erode the pivot pin 32, which can prevent the flapper 30 from operating as designed.

Figure 3:
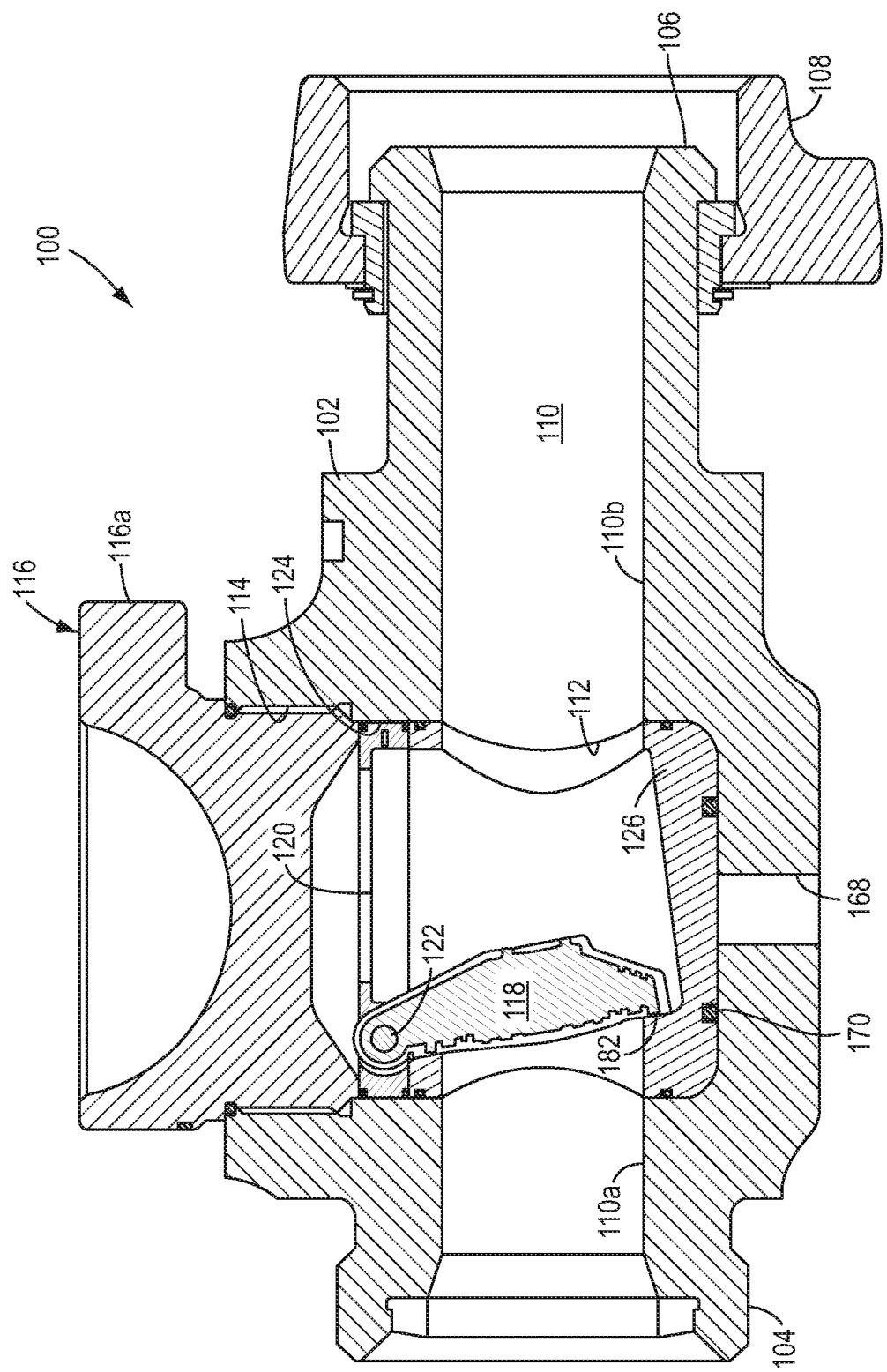
FIG. 3 is a longitudinal cross sectional view of a first embodiment of a check valve in accordance with the present disclosure.
Figure 11:
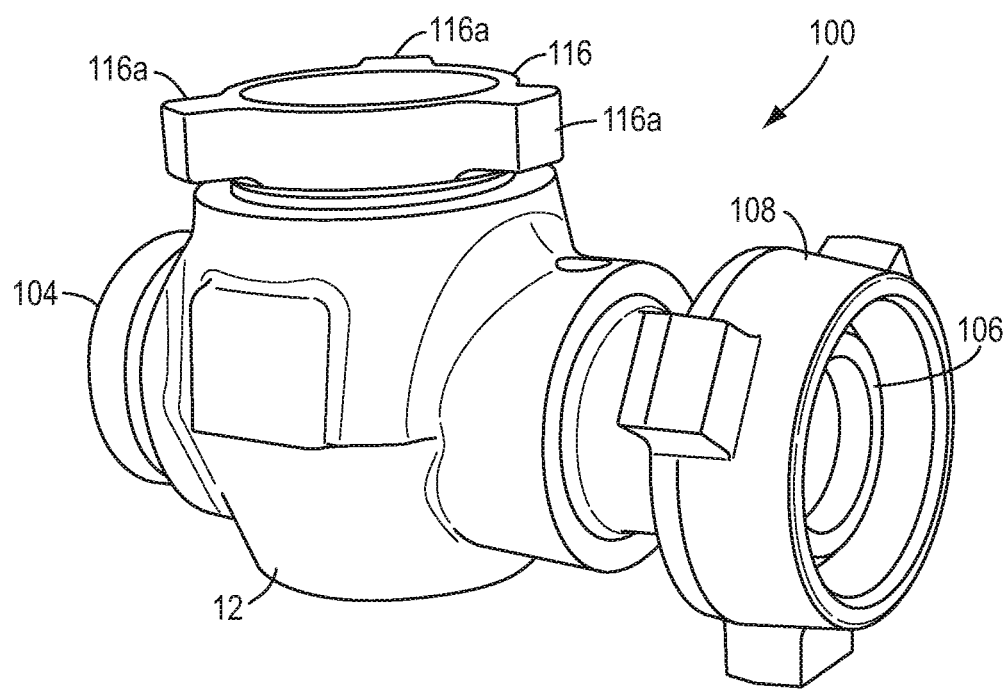
FIG. 11 is a perspective view of the check valve of FIG. 3.
Figure 12:
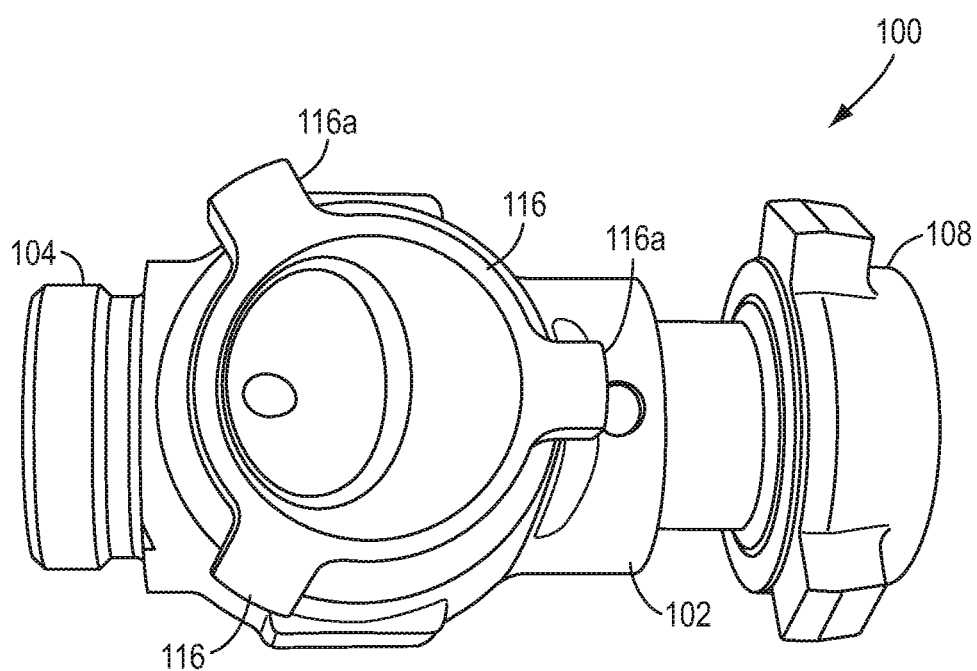
FIG. 12 is a top view of the check valve of FIG. 3.

In accordance with the present disclosure, a check valve is provided which addresses many of the problems presented by prior art check valves. Referring to FIGS. 3-12, the check valve of the present disclosure, which is indicated generally by reference number 100, includes a valve body 102 having an inlet end 104 and an outlet end 106. The inlet and outlet ends 104, 106 are configured to be connected to flow pipes or other flow components (not shown) by suitable means, such as wing unions or other high pressure connections 108 (FIGS. 11 and 12). The valve body 102 includes a flow bore 110 which extends between the inlet and outlet ends 104, 106, and a cavity 112 which intersects the flow bore. In this embodiment, the cavity 112 comprises a cylindrical configuration having an axis which is oriented generally perpendicular to the axis of the flow bore 110. Thus, when the flow bore 110 is oriented horizontally (as shown in FIG. 3), the axis of the cavity 112 is oriented vertically.

The cavity 112 is accessible through a top opening 114 in the valve body 102 which is closed by a removable body cap 116 that is threaded into the top opening. In contrast to the body cap 26 of the prior art check valve 10 described above, the body cap 116 does not have a hexagonal or other such tool profile which requires a special tool to open. Instead, the body cap 116 includes a number of radially extending lugs 116a (only one of which is shown in FIG. 3), which are configured to be struck by a hammer. Accordingly, the body cap 116 can easily be opened with a hammer, thus eliminating the need for a special tool to gain access to the components in the cavity 112.

Figure 3A:
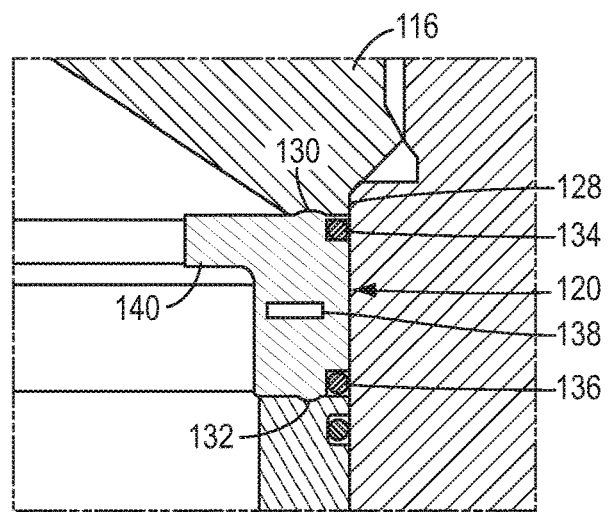
FIG. 3A is an enlarged cross sectional view of a portion of the check valve of FIG. 3.
Figure 4:
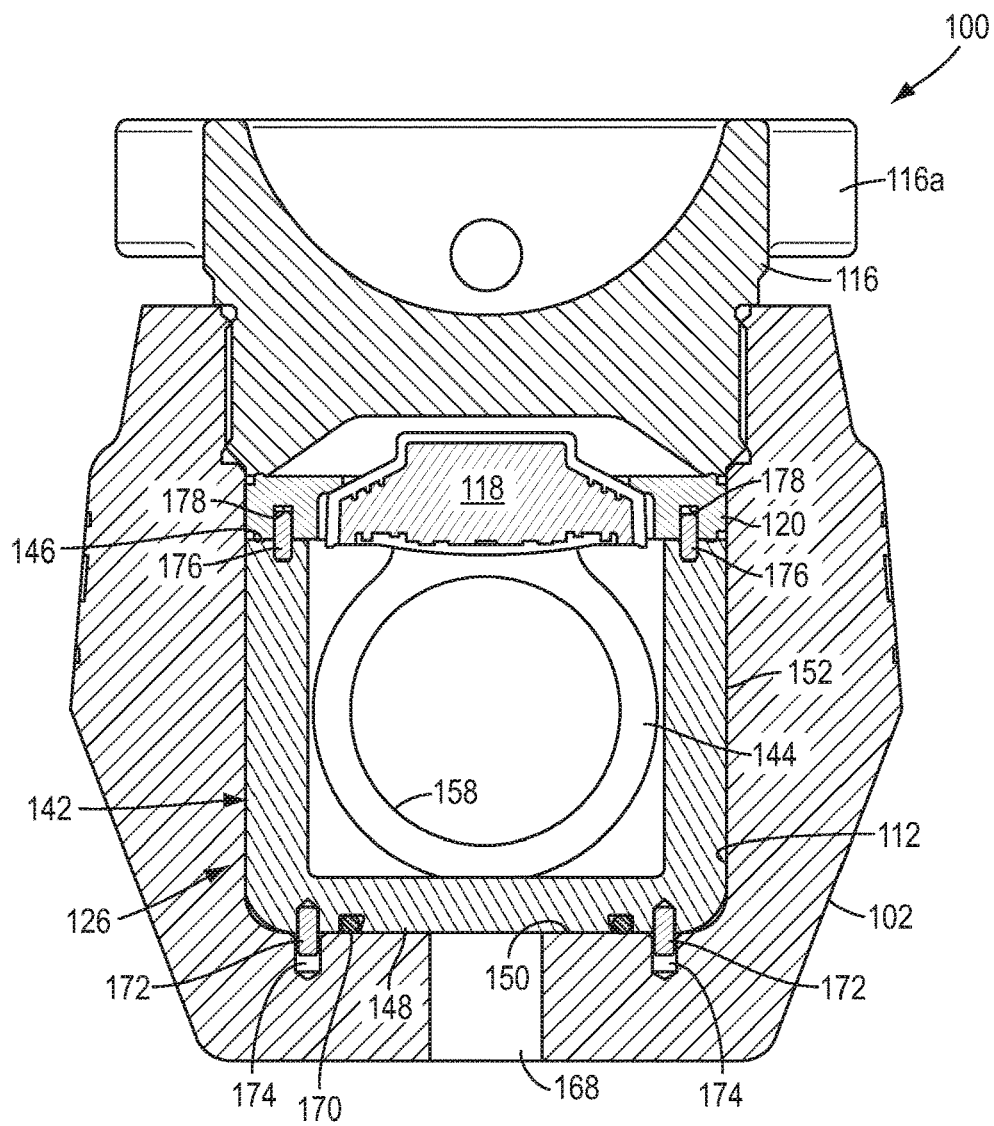
FIG. 4 is a transverse cross sectional view of the check valve of FIG. 3.

The check valve 100 includes a flapper 118 which is pivotally connected to a retainer ring or "halo" 120 by a pivot pin 122. The halo 120 is received in a reduced diameter pocket 124 in the top opening 114 and is supported on a cylindrical seat cartridge 126 which is positioned coaxially in the cavity 112. A bottom rim portion 128 of the body cap 116 secures the halo 120 in position against the seat cartridge 126. In the present embodiment, the halo 120 is preferably made of an elastomeric material, such as a suitable urethane, and functions to seal internal pressure within the check valve 100. As best seen in FIG. 3A, the halo 120 includes circular upper and lower sealing ridges 130, 132 which seal against the rim portion 128 and the seat cartridge 126, respectively. In this manner, the halo 120 forms a pressure-tight seal between the cavity 112 and the external environment without the need for additional sealing means, such as the ring seal 28 of the prior art check valve 10 discussed above. First and second suitable seal rings 134, 136 may be provided to seal between the halo 120 and the pocket 124 in order to keep proppants out from between the seat cartridge 126 and the cavity 112, which could cause the seat cartridge to become stuck in the cavity. The halo 120 may also include a stiffening ring 138 to prevent the halo from being deformed or pulled out of position by high velocity fluid flow, and a radially inwardly extending sealing flange 140, the purpose of which will be made apparent below.

The seat cartridge 126 includes a body 142 which is configured to be inserted through the top opening 114 and slidably received in the cavity 112, and a valve seat 144 which is formed integrally with the body. Although the body 142 is shown to comprise a cylindrical configuration, this is only because the cavity 112 has a cylindrical configuration in the illustrative embodiment which is shown in the drawings. Both the cavity 112 and the body 142 may comprise any practicable configuration, as long as the body can be inserted through the top opening 114 and slidably received in the cavity. The body 142 comprises an open top 146 which is aligned with the halo 120, a closed bottom 148 which is supported on a floor 150 of the cavity 112, and a cylindrical side wall 152. A chamber 154 which is configured to accommodate the flapper 118 extends axially through the body 142 from the open top 146 to the closed bottom 148, the latter of which defines a floor 156 of the chamber. A first bore 158 extends transversely through the side wall 152 and connects the chamber 154 with an inlet portion 110a of the flow bore 110, and a second bore 160 extends transversely through the side wall diametrically opposite the first bore and connects the chamber with an exit portion 110b of the flow bore. The first and second bores 158, 160 have approximately the same diameter as the flow bore 110 and are sealingly connected to the inlet and outlet bore portions, 110a, 110b, respectively, by suitable first and second seal rings 162, 164 positioned between the seat cartridge 126 and the valve body 102. The chamber 154 defines an inner wall 166 of the body 142, and the valve seat 144 is formed on a portion of the inner wall which surrounds the first bore 158. Thus, it may be seen that the seat cartridge defines a fluid pathway between the inlet bore portion 110a and the outlet bore portion 110b, and that the flapper is pivotable through the fluid pathway into a closed position to thereby prevent fluid from flowing from the outlet bore portion to the inlet bore portion through the seat cartridge.

Figure 5:
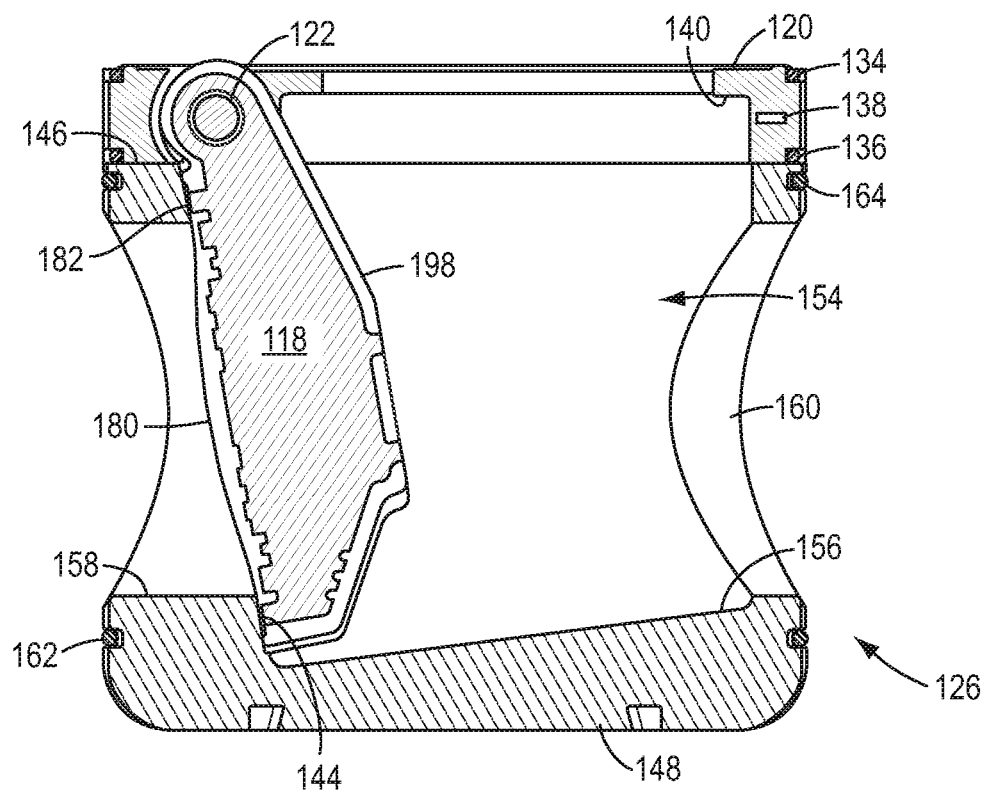
FIG. 5 is a longitudinal cross sectional view of the seat cartridge, halo and flapper components of the check valve of FIG. 3.

As shown best in FIGS. 3 and 5, the floor 156 of the seat cartridge 126 is configured as a ramp which extends from the valve seat 144 to the second bore 160. The floor 150 accordingly provides a gradual transition between the chamber 154 and the exit bore portion 110b. As a result, the floor 156 mitigates erosion in the exit bore portion 110b which may otherwise occur if this transition were more abrupt, especially when the fluid being conveyed through the check valve 100 contains proppants.

The seat cartridge 126 is an integral component which is configured to be manually installed in and removed from the cavity 112 through the top opening 124. Thus, should the valve seat 144 or the floor 156 or inner wall 166 of the chamber 154 become eroded to an unacceptable extent, the seat cartridge 126 can be removed and replaced with a new seat cartridge. In this manner, the seat cartridge 126 serves to effectively protect the valve body 102 from erosion and thereby extend the life of the check valve 100. Furthermore, the check valve 100 may include a punch out hole 168 in the bottom of the valve body 102 through which a bar or similar object may be inserted to help dislodge the seat cartridge 126 in the event the seat cartridge should become stuck in the cavity 112. A suitable ring seal 170 is positioned between the seat cartridge 126 and the floor 150 of the cavity 112 around the punch out hole 168 in order to maintain pressure within the cavity.

During assembly of the check valve 100, the seat cartridge 126 is properly aligned in the cavity 112 by a pair of cartridge alignment pins 172 which extend from the bottom 148 of the seat cartridge and into corresponding locating holes 174 in the floor 150 of the cavity. In this manner, the pins 172 will ensure that the bores 158, 160 are accurately aligned with the inlet and exit bore portions 110a, 110b, respectively. Also, the halo 120 is properly aligned with the seat cartridge 126 by a pair of halo alignment pins 176 which extend from the top 146 of the seat cartridge and into corresponding locating holes 178 in the halo. As a result, the pins 176 will ensure that the flapper 118 is accurately aligned with the valve seat 144.

Figure 6:
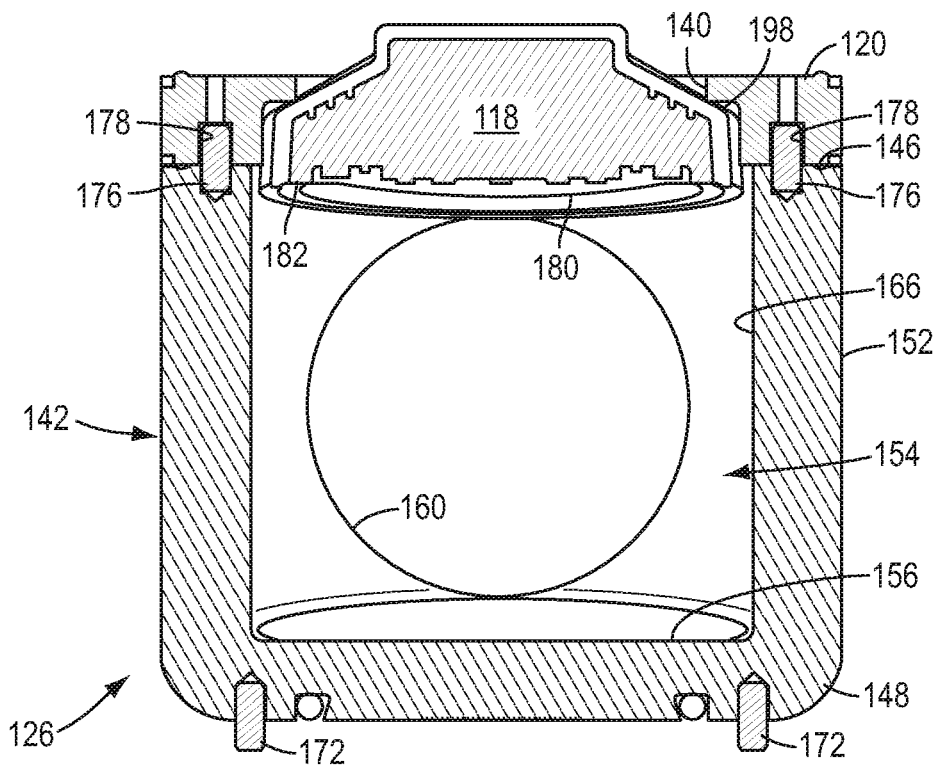
FIG. 6 is a transverse cross sectional view of the seat cartridge, halo and flapper components of the check valve of FIG. 3.
Figure 7:
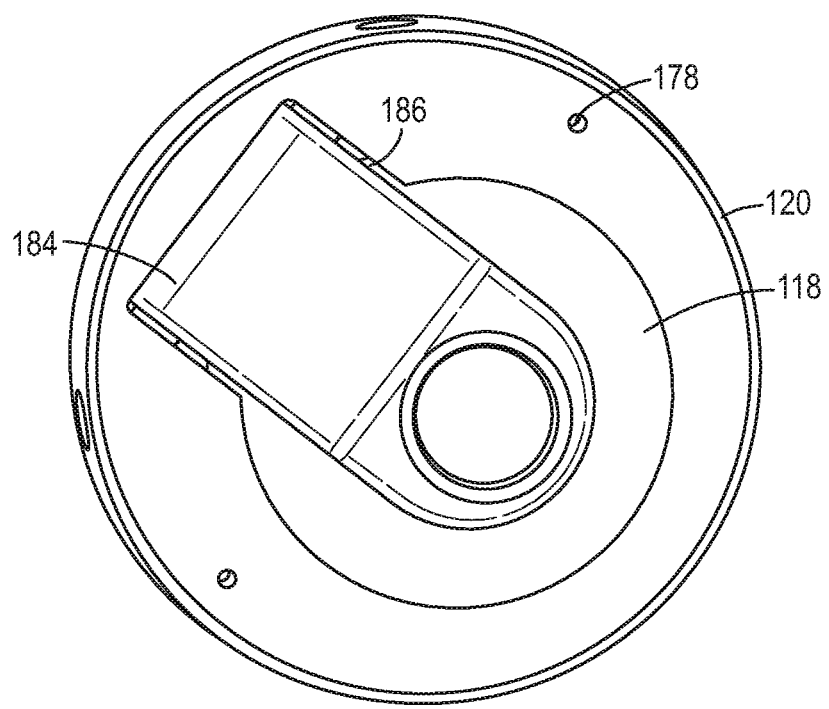
FIG. 7 is a top perspective view of the halo and flapper components of the check valve of FIG. 3 with the flapper shown in the fully open position.
Figure 8:
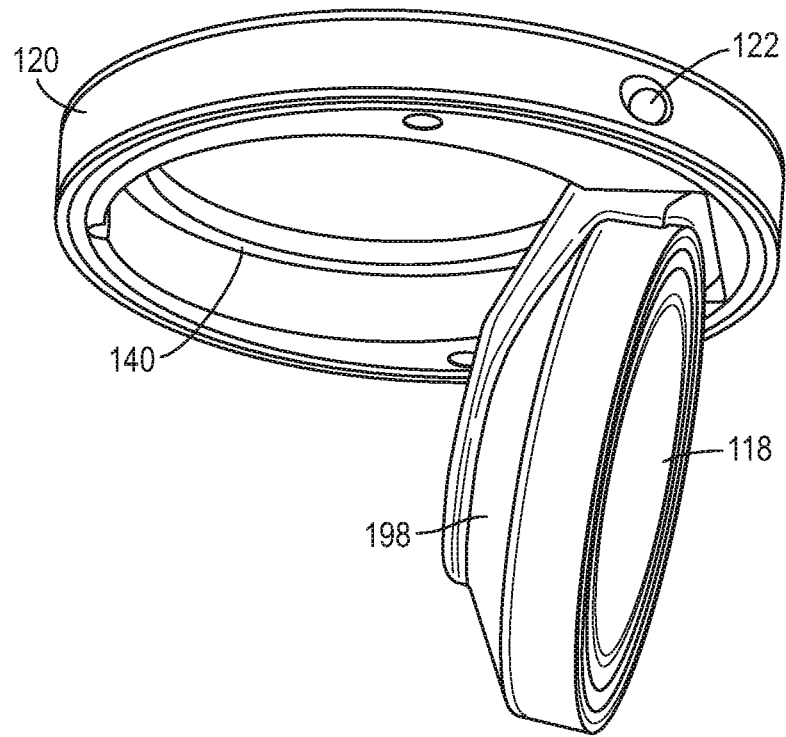
FIG. 8 is a side perspective view of the halo and flapper components of the check valve of FIG. 3 with the flapper shown in the closed position.
Figure 9:
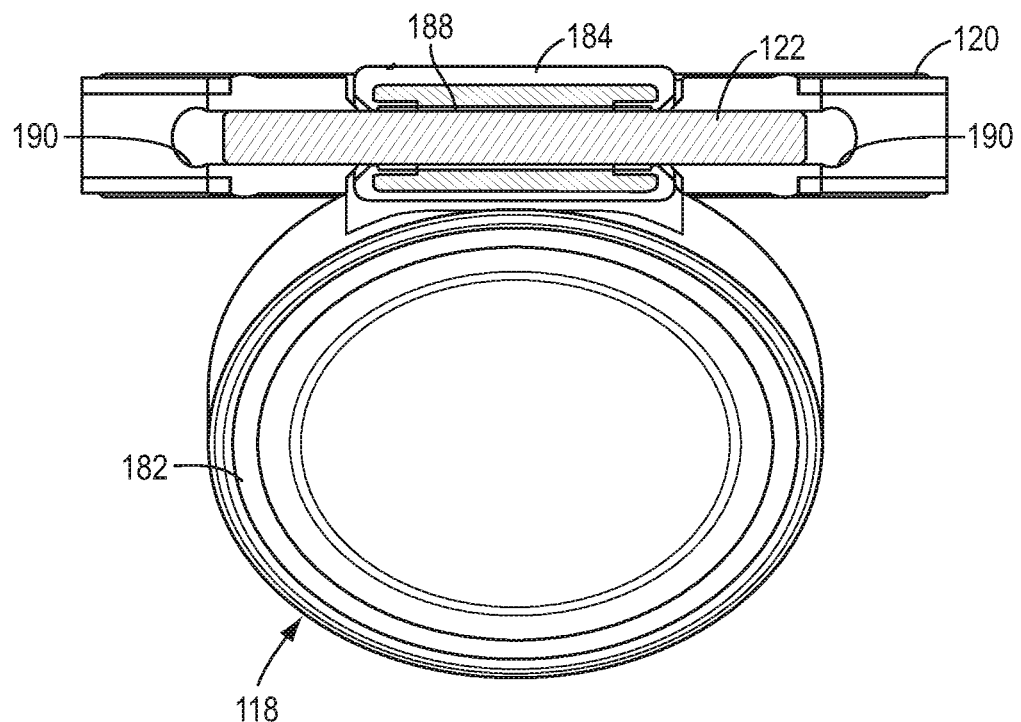
FIG. 9 is an end view, partly in section, of the halo and flapper components of the check valve of FIG. 3 with the flapper shown in the closed position.
Figure 9A:
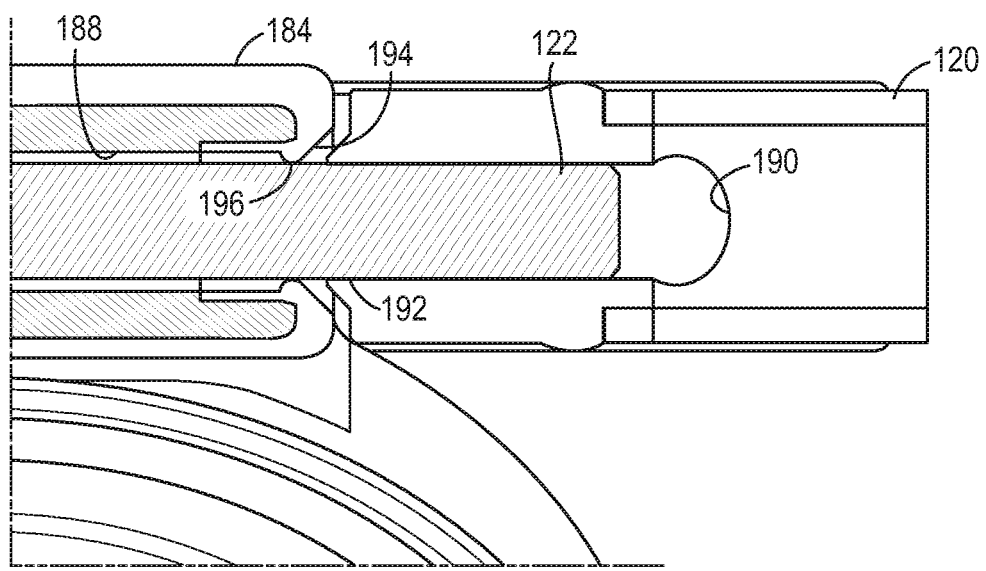
FIG. 9A is an enlarged cross sectional view of a portion of the halo and flapper components shown in FIG. 9.
Figure 10:
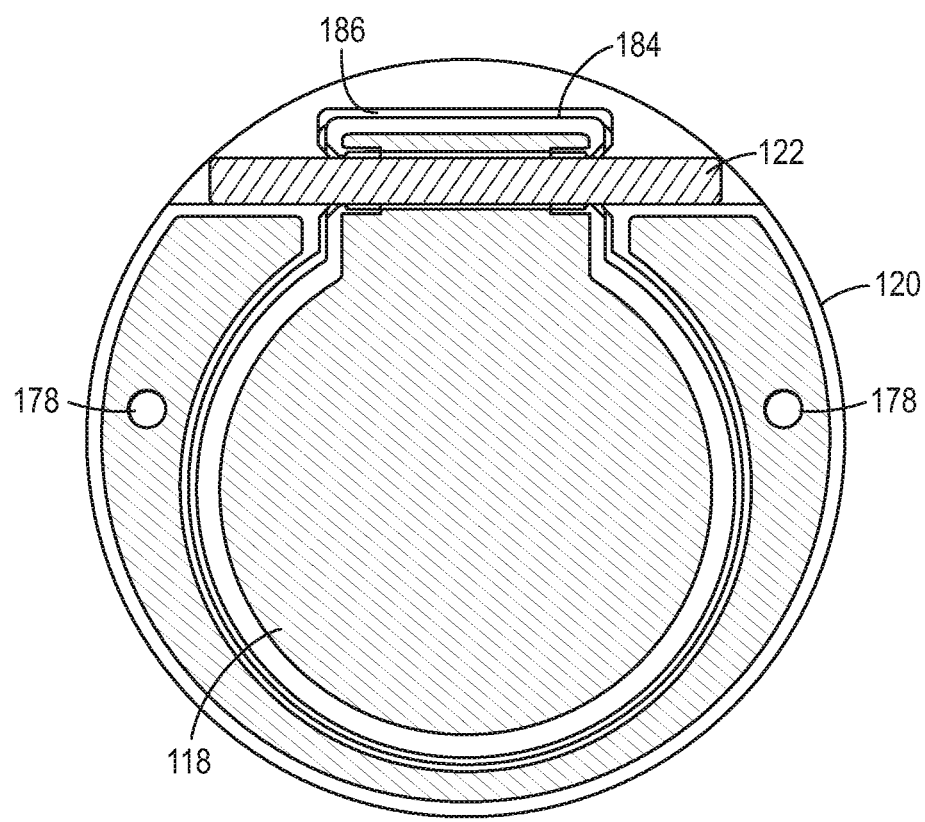
FIG. 10 is a top cross sectional view of the halo and flapper components of the check valve of FIG. 3.
Figure 10A:
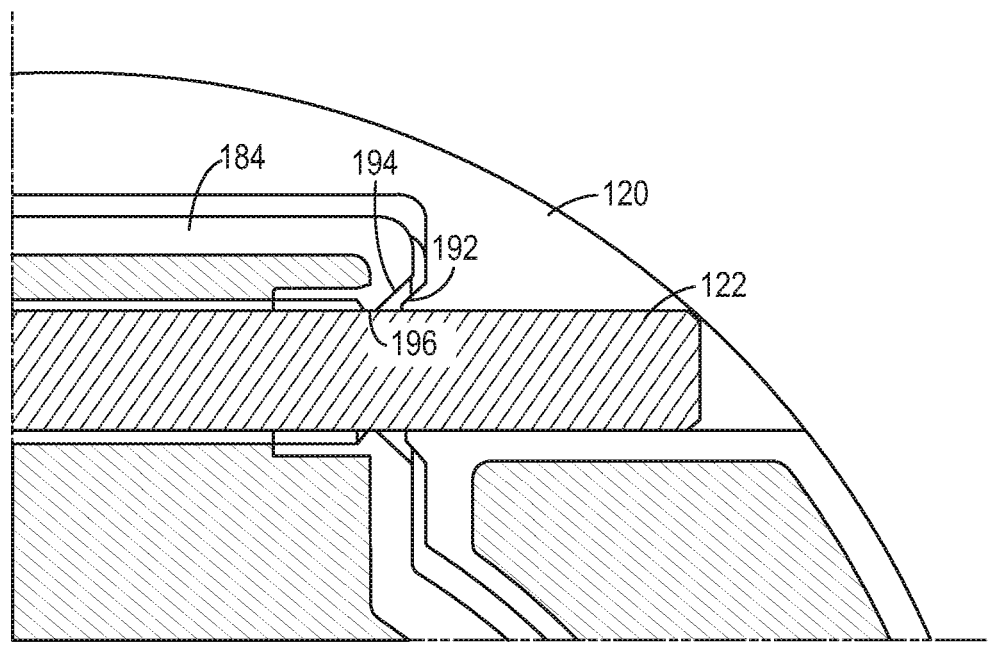
FIG. 10A is an enlarged cross sectional view of a portion of the halo and flapper components shown in FIG. 10.

As shown best in FIGS. 5 and 6, the flapper 118 includes a sealing side 180 which is configured to seal against the valve seat 144. In order to enhance the sealing ability of the flapper 118, the sealing side 180 may be coated with a resilient material, such as a urethane. However, a resilient coating can undergo plastic deformation and thereby lose its sealing effectiveness when the pressure in the flow bore 110 exceeds the compressive strength of the coating material. To prevent this from happening, the flapper 118 preferably includes a rigid stop ring 182 to limit the extent to which the coating may be compressed against the valve seat 144 when the flapper is in its closed position. As discussed more thoroughly in applicant's co-pending International Patent Application No. PCT/US2016/047842, which is hereby incorporated herein by reference, the stop ring 182 may be formed integrally with the flapper 118 or formed as a separate ring which is secured in a corresponding recess in the flapper. The stop ring 182 separates the coating on the sealing side 180 of the flapper 118 into radially inner and outer portions which are configured to sealingly engage the valve seat 144 when the flapper is in its closed position. In use, when the flapper 118 is closed and the pressure in the check valve 100 increases, the stop ring 182 will limit the extent to which the radially inner and outer portions of the coating can be compressed against the valve seat 144, thus preserving the sealing effectiveness of the coating.

As shown best in FIGS. 7-10, the flapper 118 includes a hinge portion 184 which is positioned in a rectangular recess 186 in the halo 120. The hinge portion 184 comprises a through bore 188 which is aligned with a pair of spaced apart coaxial holes 190 in the halo 120, and the pivot pin 122 is inserted through the bore and the holes in order to pivotally connect the flapper 118 to the halo. In accordance with the present disclosure, the halo 120 and the hinge portion 184 are designed to protect the pivot pin 122 from the erosive effects of fluid in the check valve 100. As shown best in FIGS. 9, 9A, 10 and 10A, the halo 120 comprises a circular lip 192 which is formed adjacent the axial inner end of each hole 190. Each lip 192 extends axially (i.e., relative to the axis of the pivot pin 122) at least partially into a corresponding beveled cavity 194 which is formed in the axial outer end of the bore 188. In addition, a radially inwardly projecting rim 196 is formed on the axial inner end of each cavity 194. The rim 196, which is preferably formed integrally with a resilient coating 198 of the flapper 118, is configured to tightly engage the pivot pin 122 while still allowing the flapper to rotate about the pivot pin. Thus, the nesting configuration of the lips 192 and the cavities 194 will prevent the fluid being conveyed through the check valve 100 from directly contacting the pivot pin 122, while the rims 196 will prevent the proppants contained in the fluid from entering the gap between the pivot pin and the bore 188. In this manner, the pivot pin 122 will be protected against abrasive wear as the flapper 118 is repeatedly pivoted open and closed.

Referring again to FIGS. 5 and 6, the check valve of the present disclosure may include means for preventing the conveyed fluid from flowing over the flapper, which could cause undue erosion of the halo 120. In particular, the flapper 118 comprises a non-sealing side 198, located opposite the sealing side 180, which is configured to seal against the sealing flange 140 on the halo 120. As shown in FIG. 6, when the flapper 118 is forced into its open position by the fluid flowing through the check valve 100, the non-sealing side of the flapper will seal against the sealing flange 140 and thereby prevent the fluid from flowing over the top of the flapper. As shown in the drawings, the non-sealing side 198 may be coated with a resilient material, such as the material with which the sealing side 180 is coated, in order to enhance the sealing of the non-sealing side to the sealing flange 140.

It should be recognized that, while the present disclosure has been presented with reference to certain embodiments, those skilled in the art may develop a wide variation of structural and operational details without departing from the principles of the disclosure. For example, the various elements shown in the different embodiments may be combined in a manner not illustrated above. Therefore, the following claims are to be construed to cover all equivalents falling within the true scope and spirit of the disclosure.

What is claimed is:

1. A check valve comprising:
 a valve body which includes an inlet end, an outlet end, a flow bore that extends between the inlet and outlet ends, a cavity which intersects the flow bore, and an opening which is connected to the cavity, the flow bore comprising an inlet bore portion which extends between the inlet end and the cavity and an outlet bore portion which extends between the outlet end and the cavity;
 a body cap which is removably secured in the opening;
 a seat cartridge which is configured to fit through the opening and be slidably received in the cavity, the seat cartridge comprising an open first end which is positioned adjacent to and aligned with the opening, a second end which is located opposite the first end, a chamber which extends between the first and second ends and defines an inner wall of the seat cartridge, a first bore which extends between the chamber and the inlet bore portion, a second bore which extends between the chamber and the outlet bore portion, and a valve seat which is formed on a portion of the inner wall that surrounds the first bore;
 a retainer ring which is positioned in the valve body between the body cap and the first end of the seat cartridge; and
 a flapper which is pivotally connected to the retainer ring, the flapper being pivotable through the chamber between a closed position in which the flapper is positioned against the valve seat and an open position in which the flapper is displaced from the valve seat.

2. The check valve of claim 1, wherein the body cap comprises a number of radially extending lugs which are configured to be struck by a hammer to thereby loosen or tighten the body cap within the opening.

3. The check valve of claim 1, wherein the body cap comprises an annular rim portion which engages the retainer ring to thereby secure the retainer ring in position against the first end of the seat cartridge.

4. The check valve of claim 1, wherein the retainer ring includes circular first and second sealing ridges which seal against the body cap and the first end of the seat cartridge, respectively.

5. The check valve of claim 1, 3 or 4, wherein the retainer ring is made of an elastomeric material.

6. The check valve of claim 5, wherein the retainer ring includes an embedded stiffening ring.

7. The check valve of claim 1, wherein the second end of the seat cartridge is closed to thereby define a floor of the chamber.

8. The check valve of claim 7, wherein the floor is configured as a ramp which extends from proximate a radially outer portion of the valve seat to the second bore.

9. The check valve of claim 7, wherein the valve body comprises a punch out hole through which the second end of the seat cartridge is accessible, whereby an object may be inserted through the punch out hole and against the second end to facilitate removal of the seat cartridge from the cavity.

10. The check valve of claim 1, wherein the flapper comprises a sealing side which is coated with a resilient material and a rigid stop ring which extends from the sealing side and limits the extent to which the resilient coating is compressed against the valve seat when the flapper is in the closed position.

11. The check valve of claim 1, wherein the flapper comprises a hinge portion which is configured to be received in a recess in the retainer ring, and wherein a pivot pin is positioned in a bore which extends through the hinge portion and two holes which extend through the retainer ring on opposite sides of the recess to thereby pivotally secure the flapper to the retainer ring.

12. The check valve of claim 11, wherein the hinge portion comprises two inwardly projecting rims, each of which is formed proximate a corresponding axially outer end of the bore and each of which is configured to engage the pivot pin.

13. The check valve of claim 11, wherein the retainer ring comprises two circular lips, each of which is formed adjacent an axially inner end of a corresponding hole and each of which extends axially at least partially into a corresponding cavity which is formed in an axially outer end of the bore.

14. The check valve of claim 13, wherein the hinge portion comprises two inwardly projecting rims, each of which is formed on an axially inner end of a corresponding cavity and each of which is configured to engage the pivot pin.

15. The check valve of claim 12, 13 or 14, wherein the lips and the rims are formed of a resilient material.

16. The check valve of claim 15, wherein the flapper is coated with a resilient material and the rims are formed integrally with the resilient coating.

17. The check valve of claim 1, wherein the flapper comprises a sealing side which engages the valve seat and a non-sealing side which is located opposite the sealing side, and wherein the check valve further comprises means for preventing fluid in the check valve from flowing over the non-sealing side when the flapper is in the open position.

18. The check valve of claim 17, wherein the means for preventing the fluid from flowing over the non-sealing side comprises a sealing flange which is formed integrally with and extends radially inwardly from an inner diameter of the retainer ring and engages the non-sealing side when the flapper is in the open position.

19. A check valve comprising:
a valve body which includes an inlet end, an outlet end, a flow bore that extends between the inlet and outlet ends, a cavity which intersects the flow bore, and an opening which is connected to the cavity, the flow bore comprising an inlet bore portion which extends between the inlet end and the cavity and an outlet bore portion which extends between the outlet end and the cavity;
a body cap which is removably secured in the opening;
a seat cartridge which is configured to be inserted through the opening and slidably received in the cavity, the seat cartridge forming a sliding fit with the cavity, defining a fluid pathway extending between the inlet bore portion and the outlet bore portion and comprising a valve seat surrounding a portion of the fluid pathway; and
a flapper which is pivotable through the fluid pathway into a closed position against the valve seat to thereby prevent fluid from flowing from the outlet bore portion to the inlet bore portion through the seat cartridge.

20. The check valve of claim 19, further comprising a retainer ring to which the flapper is pivotally connected, the retainer ring being positioned in the valve body between the body cap and the first end of the seat cartridge.

21. The check valve of claim 20, wherein the body cap comprises an annular rim portion which engages the retainer ring to thereby secure the retainer ring in position against the seat cartridge.

22. The check valve of claim 20, wherein the retainer ring includes circular first and second sealing ridges which seal against the body cap and the seat cartridge, respectively.

23. The check valve of claim 20, 21 or 22, wherein the retainer ring is made of an elastomeric material.

24. The check valve of claim 23, wherein the retainer ring includes an embedded stiffening ring.

25. The check valve of claim 20, wherein the flapper comprises a sealing side which is coated with a resilient material and a rigid stop ring which extends from the sealing side and limits the extent to which the resilient coating is compressed against the seat cartridge when the flapper is in the closed position.

26. The check valve of claim 20, wherein the flapper comprises a hinge portion which is configured to be received in a recess in the retainer ring, and wherein a pivot pin is positioned in a bore which extends through the hinge portion and two holes which extend through the retainer ring on opposite sides of the recess to thereby pivotally secure the flapper to the retainer ring.

27. The check valve of claim 26, wherein the hinge portion comprises two inwardly projecting rims, each of which is formed proximate a corresponding axially outer end of the bore and each of which is configured to engage the pivot pin.

28. The check valve of claim 26, wherein the retainer ring comprises two circular lips, each of which is formed adjacent an axially inner end of a corresponding hole and each of which extends axially at least partially into a corresponding cavity which is formed in an axially outer end of the bore.

29. The check valve of claim 28, wherein the hinge portion comprises two inwardly projecting rims, each of which is formed on an axially inner end of a corresponding cavity and each of which is configured to engage the pivot pin.

30. The check valve of claim 27, 28 or 29, wherein the lips and the rims are formed of a resilient material.

31. The check valve of claim 30, wherein the flapper is coated with a resilient material and the rims are formed integrally with the resilient coating.

32. The check valve of claim 20, wherein the flapper comprises a sealing side which engages the valve seat and a non-sealing side which is located opposite the sealing side, and wherein the check valve further comprises means for preventing fluid in the check valve from flowing over the non-sealing side when the flapper is in the open position.

33. The check valve of claim 32, wherein the means for preventing the fluid from flowing over the non-sealing side comprises a sealing flange which is formed integrally with and extends radially inwardly from an inner diameter of the retainer ring and engages the non-sealing side when the flapper is in the open position.

34. The check valve of claim 19, wherein the seat cartridge comprises:
   an open first end which is positioned adjacent to and aligned with the opening;
   a second end which is located opposite the first end;
   a chamber which extends between the first and second ends and defines an inner wall of the seat cartridge;
   a first bore which extends between the chamber and the inlet bore portion; and
   a second bore which extends between the chamber and the outlet bore portion;
   wherein the valve seat is formed on a portion of the inner wall that surrounds the first bore;
   wherein the fluid pathway is defined by the first and second bores and the chamber; and
   wherein in the closed position of the flapper, the flapper engages the valve seat.

35. The check valve of claim 34, wherein the second end of the seat cartridge is closed to thereby define a floor of the chamber.

36. The check valve of claim 35, wherein the floor is configured as a ramp which extends from proximate a radially outer portion of the valve seat to the second bore.

37. The check valve of claim 35, wherein the valve body comprises a punch out hole through which the second end of the seat cartridge is accessible, whereby an object may be inserted through the punch out hole and against the second end to facilitate removal of the seat cartridge from the cavity.

38. A method for assembling a check valve, the check valve comprising a valve body which includes an inlet end, an outlet end, a flow bore that extends between the inlet and outlet ends, a cavity which intersects the flow bore, and an opening which is connected to the cavity, the flow bore comprising an inlet bore portion which extends between the inlet end and the cavity and an outlet bore portion which extends between the outlet end and the cavity, the method comprising:
   providing a seat cartridge which is configured to be inserted through the opening and slidably received in the cavity, the seat cartridge forming a sliding fit with the cavity, defining a fluid pathway extending between the inlet bore portion and the outlet bore portion and comprising a valve seat surrounding a portion of the fluid pathway; and
   inserting the seat cartridge through the opening and into the cavity.

39. The method of claim 38, further comprising:
   providing a retainer ring to which a flapper is pivotally connected; and
   positioning the retainer ring against an end of the seat cartridge which is located adjacent the opening.

40. The method of claim 39, further comprising:
   securing the retainer ring and the seat cartridge in position in the valve body by removably securing a body cap in the opening, the body cap being configured to engage the retainer ring when fully secured in the opening.

* * * * *